United States Patent [19]

Higashi et al.

[11] Patent Number: 4,600,477
[45] Date of Patent: Jul. 15, 1986

[54] METHOD OF PROCESSING FERMENTED LIQUID

[75] Inventors: Takehiro Higashi; Michio Kobori; Zenichi Yoshino; Seiichi Morimoto, all of Kashihara, Japan

[73] Assignee: Sanwa Shoji Co., Ltd., Japan

[21] Appl. No.: 790,810

[22] Filed: Oct. 25, 1985

Related U.S. Application Data

[63] Continuation of Ser. No. 545,183, Oct. 25, 1983, abandoned.

[30] Foreign Application Priority Data

Oct. 29, 1982 [JP] Japan .................. 57-191437

[51] Int. Cl.$^4$ .................. B01D 1/28; C12P 7/06
[52] U.S. Cl. .................. 203/26; 203/19; 203/74; 203/77; 203/87; 203/DIG. 13; 202/185 A; 426/494; 435/161
[58] Field of Search .................. 203/26, 24, DIG. 13, 203/19, 87, 74, 77, 42, 91, DIG. 9; 202/153, 186, 185.2, 180; 426/494; 435/161–163

[56] References Cited

U.S. PATENT DOCUMENTS

| | | | |
|---|---|---|---|
| 1,860,554 | 5/1932 | Ricard et al. | 203/DIG. 13 X |
| 2,509,136 | 5/1950 | Cornell | 203/26 X |
| 3,230,155 | 1/1966 | Schürch | 203/26 |
| 3,475,281 | 10/1969 | Rosenblad | 203/26 |
| 4,003,801 | 1/1977 | Chikaoka et al. | 203/87 X |
| 4,115,208 | 9/1978 | Verstegen | 203/87 X |
| 4,177,137 | 12/1979 | Kruse | 203/26 X |
| 4,306,940 | 12/1981 | Zenty | 203/26 X |
| 4,328,074 | 5/1982 | Standiford | 203/26 X |
| 4,358,536 | 11/1982 | Thorsson | 203/26 X |

Primary Examiner—Wilbur Bascomb
Attorney, Agent, or Firm—Keil & Weinkauf

[57] ABSTRACT

A method of processing fermented liquid comprising (a) feeding said fermented liquid into a vacuum vaporizer, (b) heating the feed in said vaporizer to separate it into a vapor and a concentrated liquid fraction, (c) recycling said vapor to said vaporizer by compression so as to achieve heat-exchange with said feed therein thereby generating a new vapor and a condensate fraction; said condensate being discharged as a distillate, (d) supplying the remaining compressed vapor to a multistage distilling column, (e) separating said compressed vapor into two fractions, one with a higher boiling point than the other, within said distilling column, (f) condensing said distillate with the lower boiling point to yield an alcohol-rich distillate, and (g) discharging said fraction with the higher boiling point as a bottom residue, and a processor therefor, thereby discharging to the outside the low COD-liquid alone and recovering useful substances such as drinkable alcohol, livestocks feed and antibiotic substances.

3 Claims, 3 Drawing Figures

METHOD OF PROCESSING FERMENTED LIQUID

This application is a continuation of application Ser. No. 545,183, filed on Oct. 25, 1983 and now abandoned.

BACKGROUND OF THE INVENTION

1. Field of the Invention

The present invention relates to method of processing fermented liquid derived from plants such as cornstarch, wheatstarch or the like and a processor therefor. The word "fermented liquid" means a liquid, derived mainly from plant, in which fermentation has taken place artificially and/or naturally.

2. Description of the Prior Art

Fermented liquid as a waste product from cornstarch or wheatstarch factories contains a variety of volatile organic substances resulting in an extreme increase in chemical oxygen demand (referred to as COD). Thus, the fermented liquid may not be discharged without waste liquid treatment.

Waste liquid from cornstarch factories is usually subjected to a vacuum condensation treatment by means of a condenser, shown in FIG. 1, comprising four distilling tanks 100–103 in sequence and a cooler 104. The condensate fractions (a), (b), (c) and (d) discharged from the condenser are treated with an activated sludge method and then discharged into rivers. The COD of each condensate (a)–(d) is so high that these condensates make the load too heavy for use with the activated sludge used as a post-treatment. Thus, the application of the activated sludge method to those condensates is troublesome and/or costly. Moreover, useful substances such as alcohol contained in the fermented liquid are discharged without recovery.

Likewise, waste liquid from wheatstarch factories is condensed by means of the condenser shown in FIG. 1. The resulting condensates (a), (b) and (c) are combined and supplied to a distilling column, the bottom residue from which is combined with the remaining condensate (d) and subjected to an activated sludge method. This processing of the wheatstarch waste liquid requires large scale equipment and a large amount of heated vapor. The COD of the waste liquid to be applied to the activated sludge is also so high that a heavy load is imposed on the sludge thereby making the processing troublesome and costly as in the abovementioned cornstarch waste liquid.

SUMMARY OF THE INVENTION

The processing method of this invention which overcomes the above-discussed disadvantages of the prior art, comprises:

(a) feeding said fermented liquid into a vacuum vaporizer, (b) heating the feed in said vaporizer to separate it into a vapor and a concentrated liquid fraction, (c) recycling said vapor to said vaporizer by compression so as to achieve heat-exchange with said feed therein thereby generating a new vapor and a condensate fraction; said condensate being discharged, (d) supplying the remaining portion of the compressed vapor to a multistage distilling column, (e) separating said portion of the compressed vapor into two fractions, one with a higher boiling point than the other, within said distilling column, (f) condensing said fraction with the lower boiling point to yield an alcohol-rich distillate, and (g) discharging the fraction with the higher boiling point as a bottom residue.

Another method of this invention which overcomes the above-discussed disadvantages of the prior art, comprises:

(a) feeding said fermented liquid into a vacuum vaporizer, (b) heating the feed in said vaporizer to separate it into a vapor and a concentrated liquid fraction, (c) comprising the vapor and recycling said vapor to said compressed vaporizer so as to achieve heat-exchange with said feed therein thereby generating a new vapor and a condensate fraction; said concentrated fraction being discharged, (d) cooling the remaining portion of the compressed vapor outside said vaporizer to form a second condensate, (e) supplying said first condensate to a multistage distilling column, (f) cooling another portion of the remaining compressed vapor from step (d) to form a second condensate, (g) supplying said second condensate to said multistage distilling column, (h) discharging another portion of the remaining compressed vapor in step (f) through showering water to form a third condensate, (i) separating said first and second condensates into two fractions, one with a higher boiling point than the other, within said distilling column, (j) condensing said fraction with the lower boiling point to yield an alcohol-rich distillate, and (k) discharging said fraction with the higher boiling point as a bottom residue.

The alcohol-rich distillate is a drinkable alcohol containing alcohol in a concentration of about 80% by volume.

The processing unit of this invention which also overcomes the above-discussed disadvantages, comprises a vacuum vaporizer disposed upstream and a multistage distilling column disposed downstream, (a) said vaporizer having a heating element for separating said fermented liquid, which is fed thereinto via a feed inlet, into a vapor and a concentrated liquid fraction; an outlet for discharging said concentrated liquid; a vapor-compression blower for compressing said vapor and recycling said heated vapor via a vapor-recycle conduit to said vaporizer; a condensate outlet for discharging a distillate which generates by indirect heat exchange between said recycled vapor and said feed in the vaporizer; and a non-condensable vapor conduit for supplying the remaining compressed vapor in said vaporizer to said multistage distilling column, (b) said multistage distilling column having a heating medium inlet for introducing thereinto a heating medium by which said compressed vapor flowing therein via said non-condensable vapor conduit is heated to thereby separate into two fractions, one having a higher boiling point than the other; a cooling means for cooling said fractions with the lower boiling point to generate an alcohol rich distillate; a distillate outlet for discharging said distillate; and a bottom residue outlet for discharging said fraction with the higher boiling point as a bottom residue.

Another processor of this invention which also overcomes the above-discussed disadvantages comprises a vacuum vaporizer disposed upstream and a multistage distilling column disposed downstream via a cooler and a vacuum pump in sequence, (a) said vaporizer having a heating element for separating said fermented liquid, which is fed thereinto via a feed inlet, into a vapor and a concentrated liquid fraction; an outlet for discharging said concentrated liquid; a vapor-compression blower for compressing said vapor and recycling said heated vapor via a vapor-recycle conduit to said vaporizer; a distillate outlet for discharging a first distillate which generates by a heat exchange between said recycled vapor and said feed in the vaporizer; and a first non-condensable vapor conduit for supplying the remaining compressed vapor in said vaporizer to said cooler by which said compressed vapor is cooled to generate a first condensate, (b) said cooler having a condensate conduit for supplying said first condensate to said multistage distilling column via a pump; and a second non-condensable vapor conduit for supplying the remaining vapor still non-condensable even by means of said cooler to said vacuum pump, (c) said vacuum pump having a condensate conduit for supplying said non-condensable vapor together with a certain amount of sealing water flowing into said vacuum pump, as a second condensate, to said distilling column; and a non-condensable vapor outlet for discharging as a third condensate the remaining compressed vapor through showering water, and (d) said multistage distilling column having a heating medium inlet for introducing thereinto a heating medium by which the first condensate from said cooler and the second condensate from said vacuum pump are heated to thereby separate the first and the second condensates into two fractions one with a higher boiling point than the other; a cooling means for cooling said fraction with the lower boiling point to generate an alcohol rich distillate; a distillate outlet for discharging the said distillate; and a bottom residue outlet for discharging said fraction with the higher boiling point as a bottom residue.

Thus, the invention described herein makes possible the objects of (1) providing a process and a processor therefor by which a low COD-liquid is discharged alone thereby making a post-treatment using activated sludge less troublesome and economical; (2) providing a possible continuous process and a processing unit therefor; (3) providing a process and a processor therefor by which useful substances such as drinkable alcohol, livestock feed, antibiotic substances or the like can be efficiently recovered; (4) providing a processor having simple structure on a small scale; (5) providing a process and a processor therefor minimizing energy consumption; and (6) providing a process and a processor therefor which are easily operated.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 2:
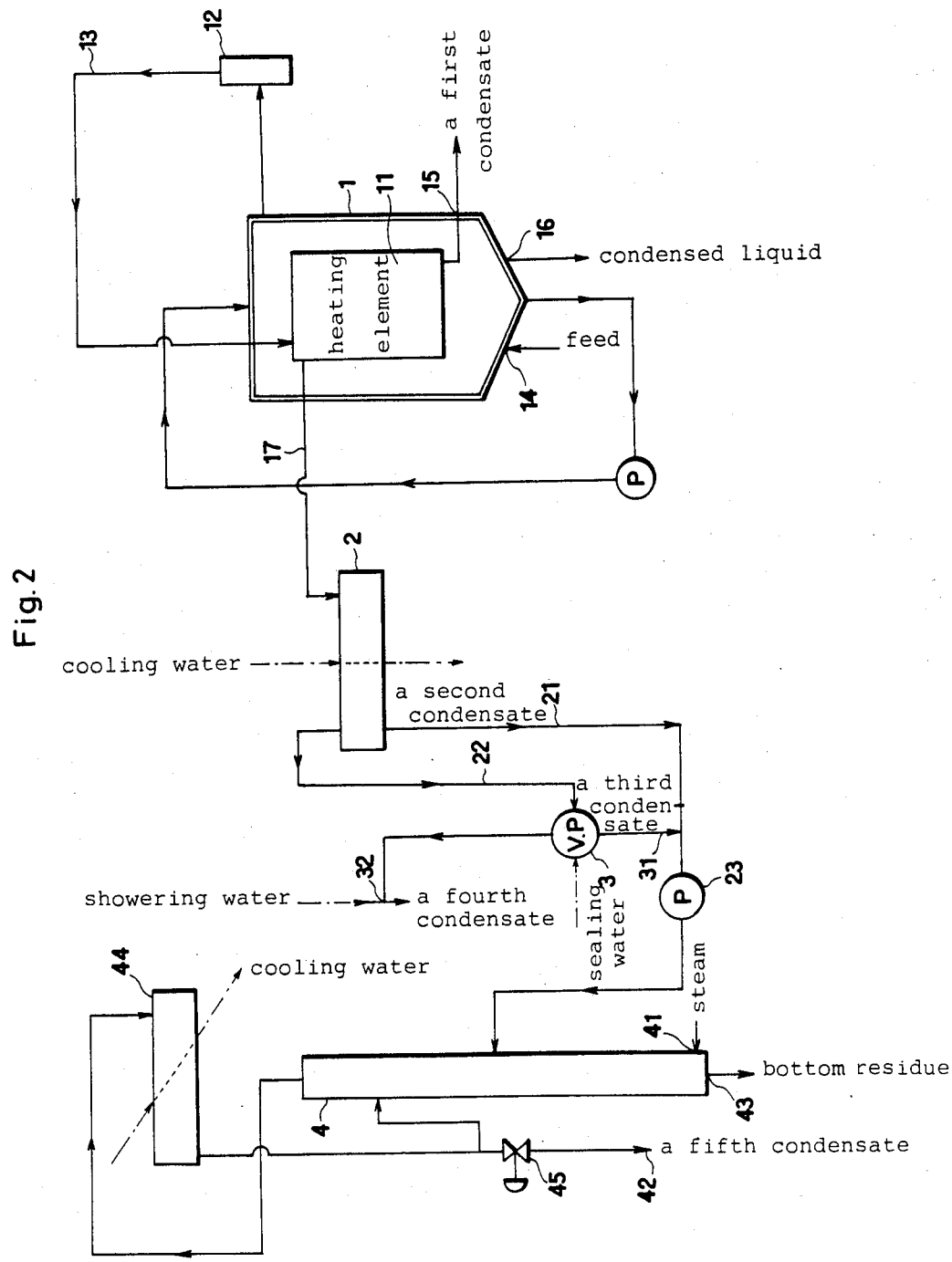
FIG. 2 is a flow diagram of a processor according to this invention.

FIG. 2 shows a processor according to this invention, which comprises a vacuum vaporizer 1 disposed upstream and a multistage distilling column 4 disposed downstream via a cooler 2 and a vacuum pump 3 in sequence. The vacuum vaporizer 1 comprises a heating element 11, a vapor-compression blower 12 and a vapor-recycle conduit 13. The heating element 11 serves to separate fermented liquid, which is fed thereinto via a feed inlet 14, into a vapor and a concentrated liquid fraction. The vapor-compression blower 12 serves to raise the vapor-temperature by compressing the vapor on and recycle the high temperature vapor to the vaporizer 1 via the vapor-recycle conduit 13. Heat exchange is achieved between the recycled vapor and the feed within the vaporizer 1, resulting in a distillate condensate which is discharged to the outside from a distillate outlet 15. The resulting concentrated liquid is also discharged to the outside from a concentrated liquid outlet 16.

The vacuum vaporizer 1 further comprises a first non-condensable vapor conduit 17 connected to the cooler 2 (e.g. a surface condenser) which comprises a condensate conduit 21 and a second non-condensable vapor conduit 22. Compressed vapor in the vaporizer 1 is introduced into the cooler 2 as a compressed vapor gas via the conduit 17 and cooled by cooling water, resulting in a first condensate which is introduced into the distilling column 4 via the condensate conduit 21 and a pump 23. The remaining vapor, which is non-condensable in the cooler 2, is introduced into a vacuum pump 3 (e.g. a Nash pump) via the second non-condensable vapor conduit 22.

The vacuum pump 3 comprises a condensate conduit 31 for introducing this second condensate into the distilling column 4 together with a certain amount of sealing water, and a non-condensable vapor outlet 32 for discharging the remaining vapor, which is still non-condensable even by the use of sealing water, through showering water to form a third condensate.

The multistage distilling column 4, which is commonly used in the art, serves to, by means of a heating medium such as a steam fed into the column 4 via a heating medium inlet 41, heat the first condensate from the cooler 2 and the second condensate from the vacuum pump 3, so as to separate the condensates into two fractions, one with a higher boiling point than the other. The fraction with the lower boiling point is cooled by means of a cooling means 44 such as a surface condenser and discharged as an alcohol rich distillate from a distillate outlet 42 via an adjustment valve 45. The fraction with the higher boiling point is discharged as a bottom residue from a bottom residue outlet 43.

Figure 3:
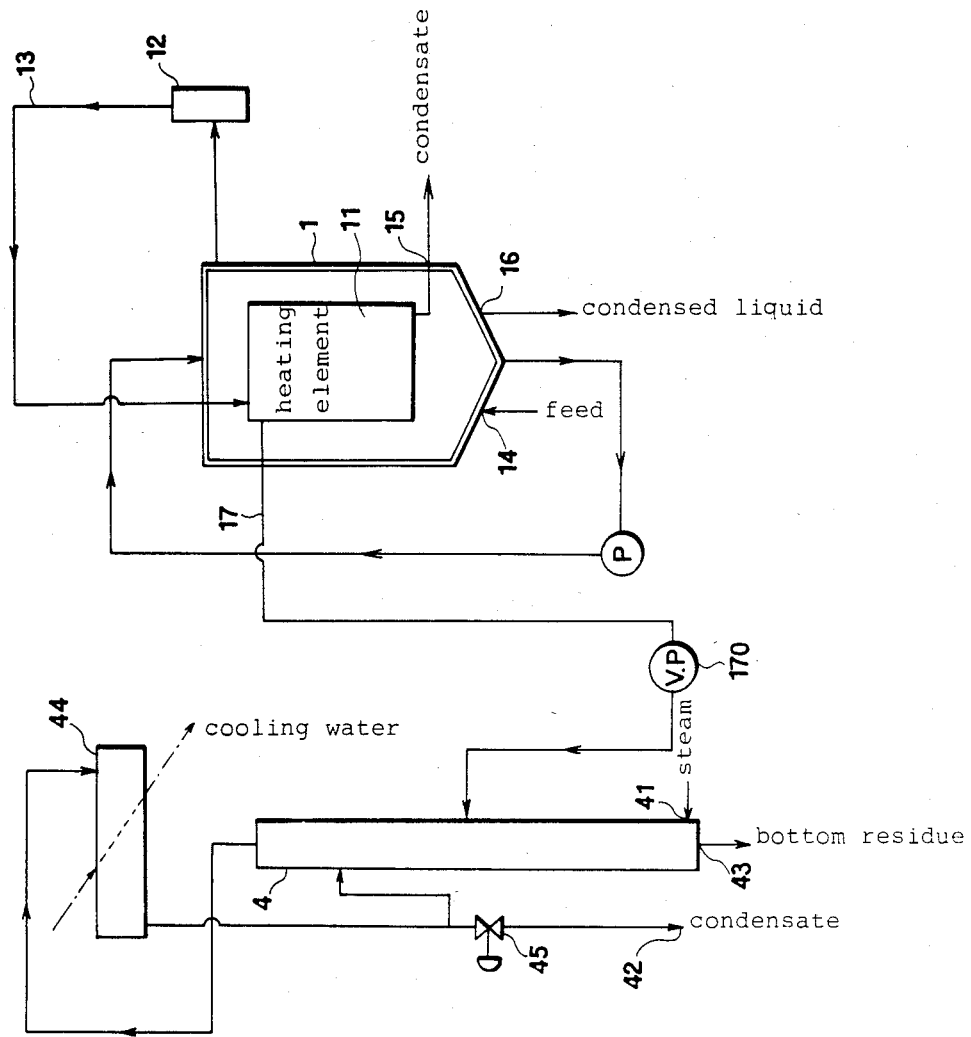
FIG. 3 is a flow diagram of another processor according to this invention.

FIG. 3 shows another processor according to this invention, which is constructed in such a manner that the non-condensable vapor conduit 17 of the vaporizer 1 is directly connected to the multistage distilling column 4. The compressed vapor from the vaporizer 1 is introduced into the distilling column 4 by the use of a Nash pump 170 or the like as desired. A vapor ejector instead of the Nash pump may be employed.

Fermented liquid can be processed by means of the processor shown in FIG. 2 as follows:

The fermented liquid is fed into the vacuum vaporizer 1 via the feed inlet 14. The feed is heated by the heating element 11 and separate into a vapor and a concentrated liquid fraction. The vapor is compressed by the vapor-compression blower 12 and its temperature rises. The high temperature vapor is recycled to the vaporizer 1 via the recycle conduit 13 and heat-exchange is achieved with the feed in the vaporizer 1 thereby generating additional vapor from the feed. The high temperature, compressed vapor is cooled to form a first distillate which is discharged to the outside. The remaining compressed vapor is introduced as a non-condensable vapor into the cooler 2 via the non-condensable vapor conduit 17 and cooled to form a condensate which is introduced as a first condensate into the distilling column 4 via the condensate conduit 21 and the pump 23. The remaining vapor, which is still non-condensable in the cooler 2, is introduced as a second condensate into the distilling column 4 together with a certain amount of sealing water in the vacuum pump 3 via the condensate conduits 21 and 31. The remaining non-condensable vapor is discharged as a third condensate through showering water via the non-condensable vapor outlet 32.

The first and second condensates introduced into the distilling column 4 are heated by a steam fed into the column 4 via a steam inlet 41, and separate into two fractions, one with a higher boiling point than the other. The fraction with the lower boiling point is cooled by the cooling means 44 and then discharged to the outside as an alcohol rich distillate containing alcohol in a high concentration. The distillate with the higher boiling point is discharged to the outside as a bottom residue via the outlet 43.

As a result, the treated liquid discharged from the processor according to this invention is the first distillate, the third condensate and the alcohol rich distillate. The alcohol rich distillate, indeed, contains alcohol in concentration of about 80% by volume and being subjected to an alcohol purification process. Thus, only the distillate first and the third condensates are substantially discharged to the outside, the COD of which is so low that the application of these condensates to the activated sludge treatment as a post-treatment is remarkably easy.

The fermented liquid may be treated by means of the processor shown in FIG. 3, in the same manner as in the processor shown in FIG. 2, in which the non-condensable heated vapor from the vaporizer 1 is directly supplied to the distilling column 4 thereby enabling the small scale and the simple structure of the processor and less energy consumption in the distilling column 4. In addition, since the sealing water and the showering water to cool the non-condensable vapor as used in the processor shown in FIG. 2 are not used, the amount of liquid to be discharged to the outside becomes smaller than that in the processor shown in FIG. 2, so that the activated sludge treatment to be later applied to the discharged liquid could become easier.

Thus, the practical economical advantages obtained from the process and the processor according to this invention are enormous.

EXAMPLE 1

Liquid produced of the processing of corn in a cornstarch factory was used as a waste liquid. In the liquid, fermentation had taken place based on water-soluble components such as glucose, amino acids and the like derived from corn by lactobacillus reproducing in the immerse tank. Five-hundred and sixty cubic meters per day of the liquid (containing solid in concentration of 10% by weight and water) was continuously fed into a vacuum vaporizer (height 10 m; inside diameter 4.5 m; and vaporization capacity 25 $m^3$/hr). The capacity of the vapor-compression blower 12 used was 600 KW. The amount of the concentrated liquid obtained from the vaporizer was 55 $m^3$/day, which is called corn steep liquor, being used as a livestock feed or an antibiotic substance. The condensate obtained from the vaporizer as a first distillate was 480 $m^3$/day, the COD of which was 300 ppm. The non-condensable vapor generated was 25 $m^3$/day (in liquid equivalent) which was introduced into the cooler (a surface condenser having the heat transmission surface of 29 $m^2$)2 wherein 10 $m^3$/day of condensate having a COD of 20,000 ppm was formed as a first condensate and then supplied to the distilling column 4. Fifteen cubic meters per day of non-condensable gas generated in the cooler 2 was introduced as a second condensate at 40 $m^3$/day having a COD of 20,000 ppm into the distilling column 4 together with 25 $m^3$/day of sealing water via a Nash vacuum pump (15 KW)3. The non-condensable vapor from the Nash vacuum pump 3 was discharged to the outside as a third condensate at 30 $m^3$/day having a COD of 600 ppm through showering water.

The multistage distilling column 4 is 1,396 cm in height and 60 cm in inside diameter and has 36 steps therein consisting of porous boards, each of which has 511 pores the diameter of which is 4.5 mm up to the 24th step and 5 mm up to the 34th step. The first and the second condensates introduced into the distilling column 4 were heated by 7 tons/day of steam and separated into two fractions one with a higher boiling point than the other. The fractions with the lower boiling point was cooled by the cooling means 44 of a surface condenser having 50 $m^2$ of the heat transmission surface and 30 to 40 $m^3$/hr of the cooling capacity, resulting in, as an alcohol rich distillate, 1.9 $m^3$/day of aqueous alcohol containing alcohol in a concentration of about 80% by volume. This aqueous alcohol was then subjected to an alcohol purification treatment. Fifty-five cubic meters per day of the fraction with the higher boiling point having a COD of 100 ppm as a bottom residue was discharged to the outside from the distilling column 4. As a result, the COD of the first distillate and the third condensate and the bottom residue discharged from the system amounted to 167.5 kg. The aqueous alcohol containing alcohol in a concentration of 80% by volume obtained as the fourth condensate was used as a drinkable alcohol. The vacuum vaporizer 1 was obtained by, for example, a modification of a losco-evaporater available from SUMITOMO JUKIKAI Ind. Co. Ltd., Japan.

Figure 1:
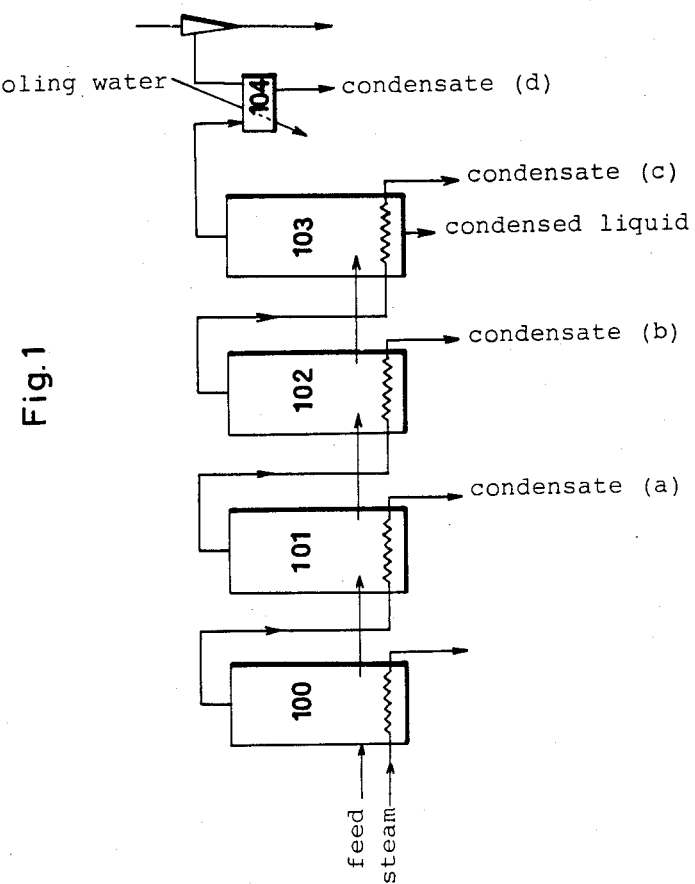
FIG. 1 is a flow diagram showing a conventional method of processing fermented liquid.

On the other hand, as a control the same kind and the same amount of the liquid as in the above-mentioned example was treated by means of the condenser shown in FIG. 1. An amount of the resulting condensate was 505 $m^3$/day having a COD of 3,750 ppm. Thus, the COD amounting to 1,890 Kg was discharged. Alcohol was not yielded from the condensate.

The amount of COD in the treated liquid according to this invention in Example 1 is 1/10 times that of the control.

EXAMPLE 2

A large amount of water is wasted in the separation of wheatstarch from wheatprotein and the purification thereof. Since the water contains soluble carbohydrates, starch, protein, nitrogen compounds and the like in high concentration, it is necessary to alcohol-ferment the water prior to the discharge thereof. The resulting fermented liquid amount to 411 m³/day, which generally contains 29% by weight of alcohol (in anhydride equivalent), 22% by weight of crude protein, 11% by weight of reducing sugar and others, was introduced into the vacuum vaporizer 1 in the same manner as in Example 1. From the vaporizer, 18 m³/day of concentrated liquid was discharged and used as a livestock feed. From the vaporizer, 368 m³/day of the first distillate having a COD of 300 ppm was further discharged and 25 m³/day of non-condensable vapor was introduced into the cooler 2, from which 10 m³/day of the first condensate having a COD of 60,000 to 70,000 ppm was supplied to the multistage distilling column 4. The remaining vapor, which is non-condensable in the cooler 2, was also introduced as the second condensate into the distilling column 4 together with 25 m³/day of sealing water via the Nash vacuum pump 3. The second condensate amounted to 40 m³/day, which had a COD of 60,000 to 70,000 ppm. The remaining vapor which is still non-condensable in the pump 3 was discharged to the outside as the third condensate through showering water. The third condensate amounted to 30 m³/day having a COD of 600 ppm. The first and the second condensates introduced into the distilling column 4 were heated by 70 tons/day of steam and separated into two fractions one with a higher boiling point than the other. The fraction with the lower boiling point was cooled by the cooling means 44 to form the alcohol rich distillate which was an aqueous alcohol containing alcohol in a concentration of about 80% by volume. The aqueous alcohol amounting to 3.9 m³/day was discharged to the outside. The higher boiling point fraction, amounting to 53 m³/day and having a COD of 100 ppm, was also discharged to the outside. As a result, the COD of the first distillate and the third condensate and the bottom residue discharged from the system amounted to 167.5 Kg. The aqueous alcohol obtained as the alcohol rich distillate was subjected to a purification treatment resulting in a drinkable alcohol.

As a control 411 m³/day of alcohol fermented liquid was introduced into the condenser shown in FIG. 1 resulting in the condensates (a), (b) and (c) amounting to 295 m³ with a COD of 10,000 ppm, which were supplied to a 3,960 mm tall-distilling column having 25 steps consisting of porous boards, each pore of which is 1,200 mm in inside diameter. Into this distilling column, 48 tons/day of steam was fed to yield 3.9 m³/day of aqueous alcohol in a concentration of 80% by volume and 339 m³/day of bottom residue having a COD of 250 ppm. The remaining condensate (d) to be discharged from the condenser amounted to 116 m³ having a COD of 2,400 ppm. Thus, the COD of the discharged liquid (namely, the bottom residue and the condensate (d)) amounted to 363 Kg.

Therefore, the amount of COD discharged from the system according to this invention was ½ times that of the control and the amount of steam to be used in this invention was 1/7 times that of the control.

EXAMPLE 3

Five-hundred and sixty cubic meters per day of the same cornstarch waste liquid as in Example 1 was fed into the same vaporizer 1 as in Example 1, and 55 m³/day of concentrated liquid and 480 m³/day of first distillate (COD: 300 ppm) were obtained. The concentrated liquid was used as a livestock feed and a antibiotic substance. Twenty-five cubic meters per day of compressed vapor generating in the vaporizer 1 was supplied to the multistage distilling column 4 together with 25 m³/day of sealing water by means of the Nash pump (capacity: 30 KW) 170 via the conduit 17. Three tons per day of steam was fed into the distilling column 4 in which two fractions, one with a higher boiling point were separated. The fraction with the lower boiling point was cooled by the cooling means 44 to yield 1.9 m³/day of alcohol-rich-water containing alcohol in a concentration of about 80% by volume, which was subjected to an alcohol purification treatment. The fraction with the higher boiling point was discharged from the distilling column 4 as a bottom residue amounting to 51 m³/day and having a COD of 100 ppm. As a result, the COD of the condensate and the bottom residue amounted to 149.1 Kg. Moreover, 1.9 m³/day of aqueous alcohol in concentration of 80% by volume was yelded from the distilling column 4. The amount of steam to be fed into the distilling column 4 was as little as 3 tons/day. These facts indicate that the processing and the processor according to this invention are significantly advantageous over the control.

We claim:

1. A method of processing a fermented liquid containing alcohol comprising:
    (a) feeding said fermented liquid into a vacuum vaporizer,
    (b) heating the feed in said vaporizer to separate it into a vapor and a concentrated liquid fraction, said concentrated liquid fraction being discharged to the outside and recovered as a product as a livestock feed or an antibiotic substance,
    (c) compressing the vapor,
    (d) passing the compressed vapor in indirect heat exchange with the fermented liquor as the source of heat to produce additional vapor in the vacuum vaporizer thereby condensing compressed vapor,
    (e) discharging the condensed vapor to the outside as a distillate, the COD of which is so low that the application thereof to an activated sludge treatment as a post-treatment is remarkably easy thereby minimizing energy consumption,
    (f) supplying a portion of the remaining compressed vapor to a multistage distilling column,
    (g) separating said portion of the compressed vapor into two fractions, one with a higher boiling point than the other, within said distilling column,
    (h) condensing said fraction with the lower boiling point to yield an alcohol-rich distillate, and
    (i) discharging the other fraction with the higher boiling point to the outside as a bottom residue, the COD of which is so low that the application thereof to an activated sludge treatment as a post-treatment is remarkably easy thereby minimizing energy consumption.

2. A method of processing a fermented liquid containing alcohol comprising:
    (a) feeding said fermented liquid into a vacuum vaporizer,
    (b) heating the feed in said vaporizer to separate it into a vapor and a concentrated liquid fraction,
    (c) compressing the vapor,
    (d) passing the compressed vapor in indirect heat exchange with the fermented liquor as the source of heat to produce additional vapor in the vacuum vaporizer and thereby condensing a portion of the compressed vapor, (e) discharging the condensed vapor as a distillate,
(f) cooling a portion of the remaining compressed vapor outside said vaporizer to form a first condensate,
(g) supplying said first condensate to a multistage distilling column,
(h) cooling another portion of the remaining compressed vapor in step (f) to form a second condensate,
(i) supplying said second condensate to said multistage distilling column,
(j) discharging another portion of the remaining compressed vapor in step (h) through showering water to form a third condensate,
(k) separating said first and second condensates into two fractions, one with a higher boiling point than the other, within said distilling column,
(l) condensing said fraction with the lower boiling point to yield an alcohol rich distillate, and
(m) discharging the other fraction with the higher boiling point as a bottom residue.

3. A method as defined in claim 2, wherein said alcohol-rich-distillate is a drinkable alcohol containing alcohol in concentration of about 80% by volume.

* * * * *